United States Patent

Chen

Patent Number: 5,239,687
Date of Patent: Aug. 24, 1993

[54] WIRELESS INTERCOM HAVING A TRANSCEIVER IN WHICH A BIAS CURRENT FOR THE CONDENSER MICROPHONE AND THE DRIVING CURRENT FOR THE SPEAKER ARE USED TO CHARGE A BATTERY DURING TRANSMISSION AND RECEPTION, RESPECTIVELY

[76] Inventor: Shih-Chung Chen, 1-21, Yu Lo Hsin Tsuen, Nan Yang Road, Feng Yuan, Taichung, Taiwan

[21] Appl. No.: 695,998
[22] Filed: May 6, 1991
[51] Int. Cl.⁵ ............................................. H04B 1/46
[52] U.S. Cl. .................................... 455/79; 455/343; 455/127; 320/2
[58] Field of Search .................. 455/343, 78, 79, 80, 455/82, 83, 89, 127; 320/2

[56] References Cited

U.S. PATENT DOCUMENTS

| | | | |
|---|---|---|---|
| 3,980,996 | 9/1976 | Greenspan | 455/127 |
| 4,426,733 | 1/1984 | Brenig | 455/79 |
| 4,673,861 | 6/1987 | Dubovsky et al. | 455/89 |
| 4,684,870 | 8/1987 | George et al. | 320/2 |

OTHER PUBLICATIONS

L. R. Grump; Powering Transistorized Electronic Devices with Radiated Energy; Dec. 1957; pp. 1-17; Office of Technical Services, DOC.

*Primary Examiner*—Reinhard J. Eisenzopf
*Assistant Examiner*—Philip J. Sobutka
*Attorney, Agent, or Firm*—Bacon & Thomas

[57] ABSTRACT

In a voice-controllable transceiver of a wireless intercom, the bias voltage for the condenser microphone is divided during transmission to give a current of 0.6 mA to 1mA. During reception, the driving voltage for the speaker is multiplied and rectified to a current of 1mA to 30mA. Both currents are used to charge a battery, resulting in a voice-controllable circuit having low power consumption circuit. The voice-controllable transceiver therefore does not require an external power source or frequent battery replacement.

1 Claim, 4 Drawing Sheets

...

WIRELESS INTERCOM HAVING A TRANSCEIVER IN WHICH A BIAS CURRENT FOR THE CONDENSER MICROPHONE AND THE DRIVING CURRENT FOR THE SPEAKER ARE USED TO CHARGE A BATTERY DURING TRANSMISSION AND RECEPTION, RESPECTIVELY

BACKGROUND OF THE INVENTION

1. Field of the Invention

The present invention relates to a voice-control transceiver of a wireless intercom, and especially to a voice-control transceiver of a wireless intercom having a self-feed function which does not require external power or frequent battery replacement.

2. Description of the Prior Art

The present invention is directed to a voice-control transceiver of a wireless intercom.

As shown in FIG. 1, a conventional transceiver of a wireless intercom includes a wireless intercom main set 100, a voice-control circuit 200 connected to the wireless intercom main set, a microphone 300 output from the voice-control circuit, an earphone 400 output from the voice-control circuit, and a power source. The power source maybe a separate power source 500 or a battery 600 which is shown in the same figure with dotted lines. The above mentioned wireless intercom transceiver has the following disadvantages while in use:

1. The voice-control circuit, microphone and the earphone consume a large amount of power. If the power source is a battery, frequent replacement is required, which is bothersome and also uneconomical.

2. The voice-control circuit, microphone and earphone occupy a considerable amount of space. The complexity of the assembly and parts results in a device which is neither light, thin nor convenient.

SUMMARY OF THE INVENTION

Thus, an object of the present invention is to provide a wireless intercom transceiver which can be contained in a small volume, does not require a large number of parts, and as a result is light and convenient.

Another object of the invention is to provide a wireless intercom transceiver which has a low power consumption and does not require an external power source or frequent battery replacement and which therefore is extremely economical and effective.

Yet another object of the invention is to provide a voice-controllable wireless intercom transceiver having a smaller volume, and fewer components so that the overall cost for production is greatly reduced.

A more complete understanding of these and other features and advantages of the present invention will become apparent from a careful consideration of the following detailed description of certain embodiments illustrated in the accompanying drawings.

DETAILED DESCRIPTION OF THE PREFERRED EMBODIMENTS

Figure 1:
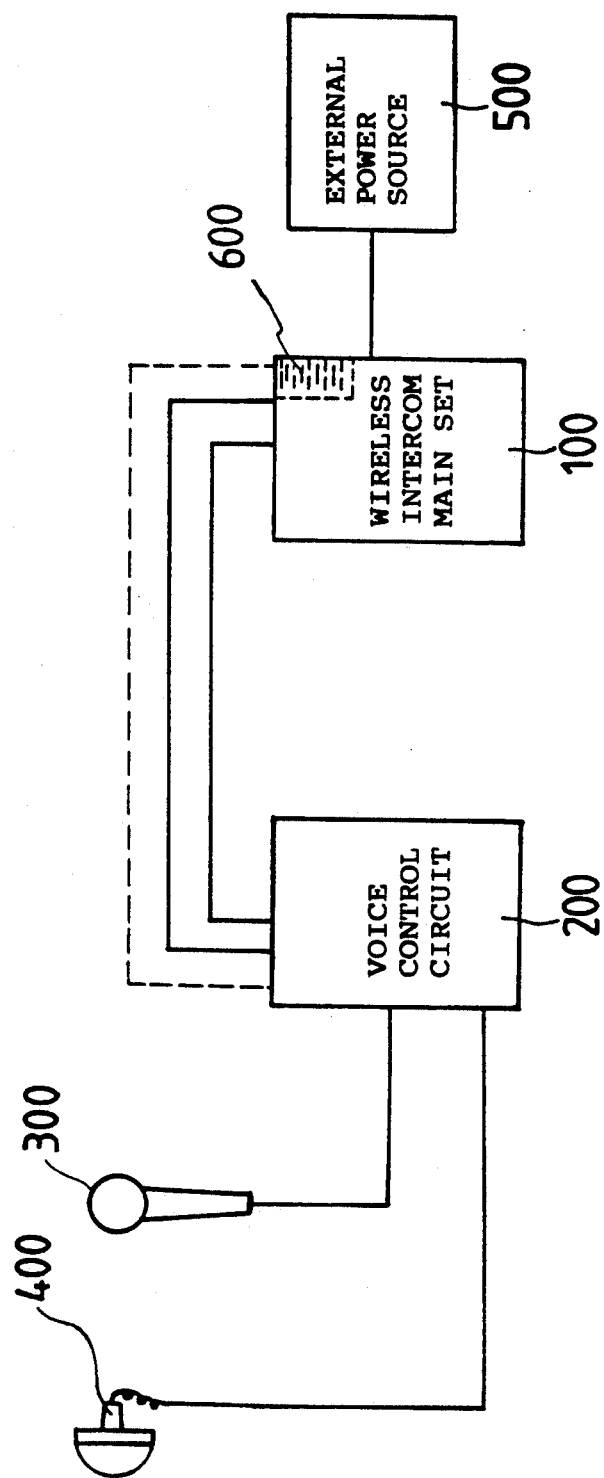
FIG. 1 is a graph illustrating a conventional wireless intercom transceiver.

The construction and disadvantages of the conventional wireless intercom transceiver shown in FIG. 1 are described above and will not be repeated here.

Figure 2:
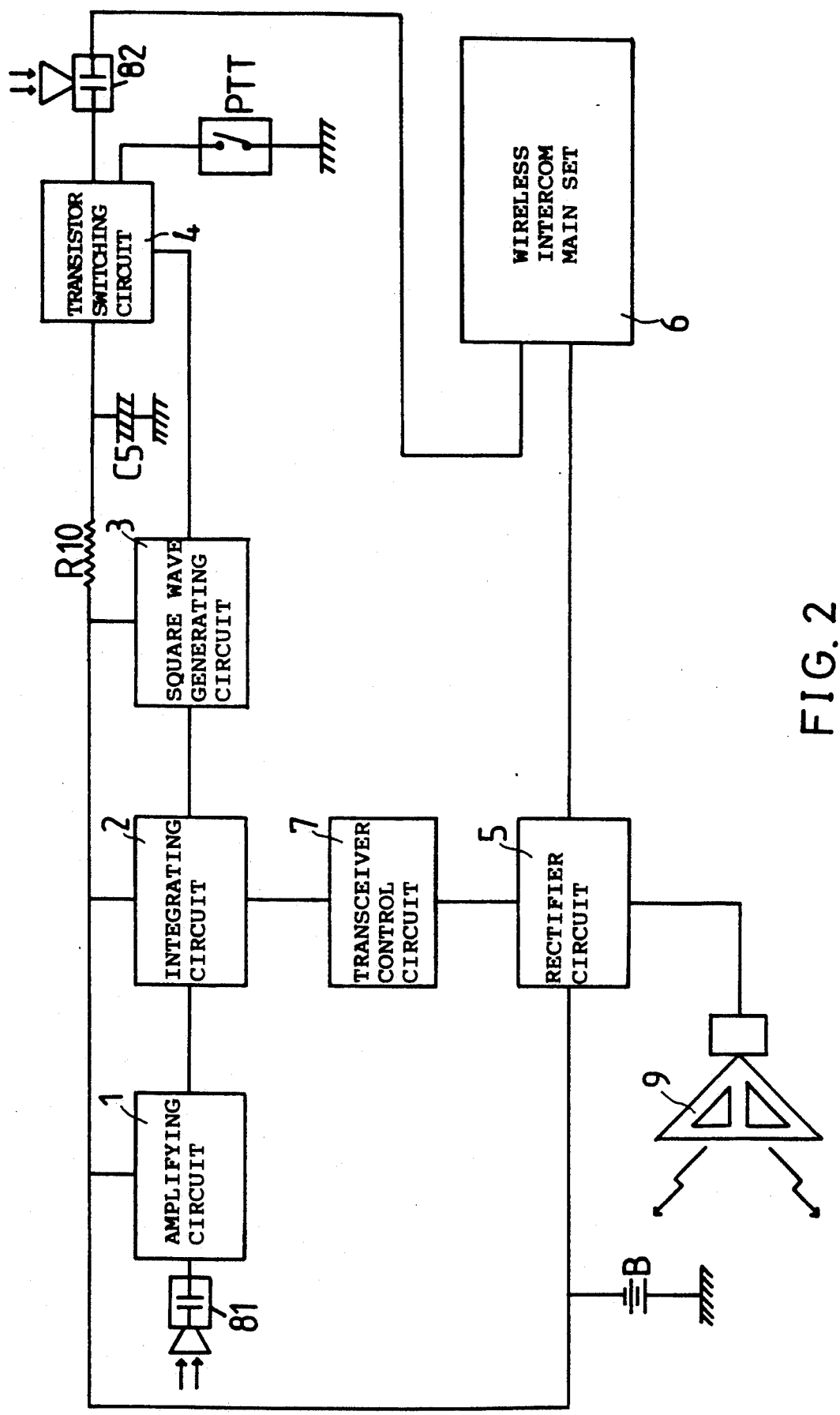
FIG. 2 is a block diagram showing the electrical circuit of the present invention.
Figure 3:
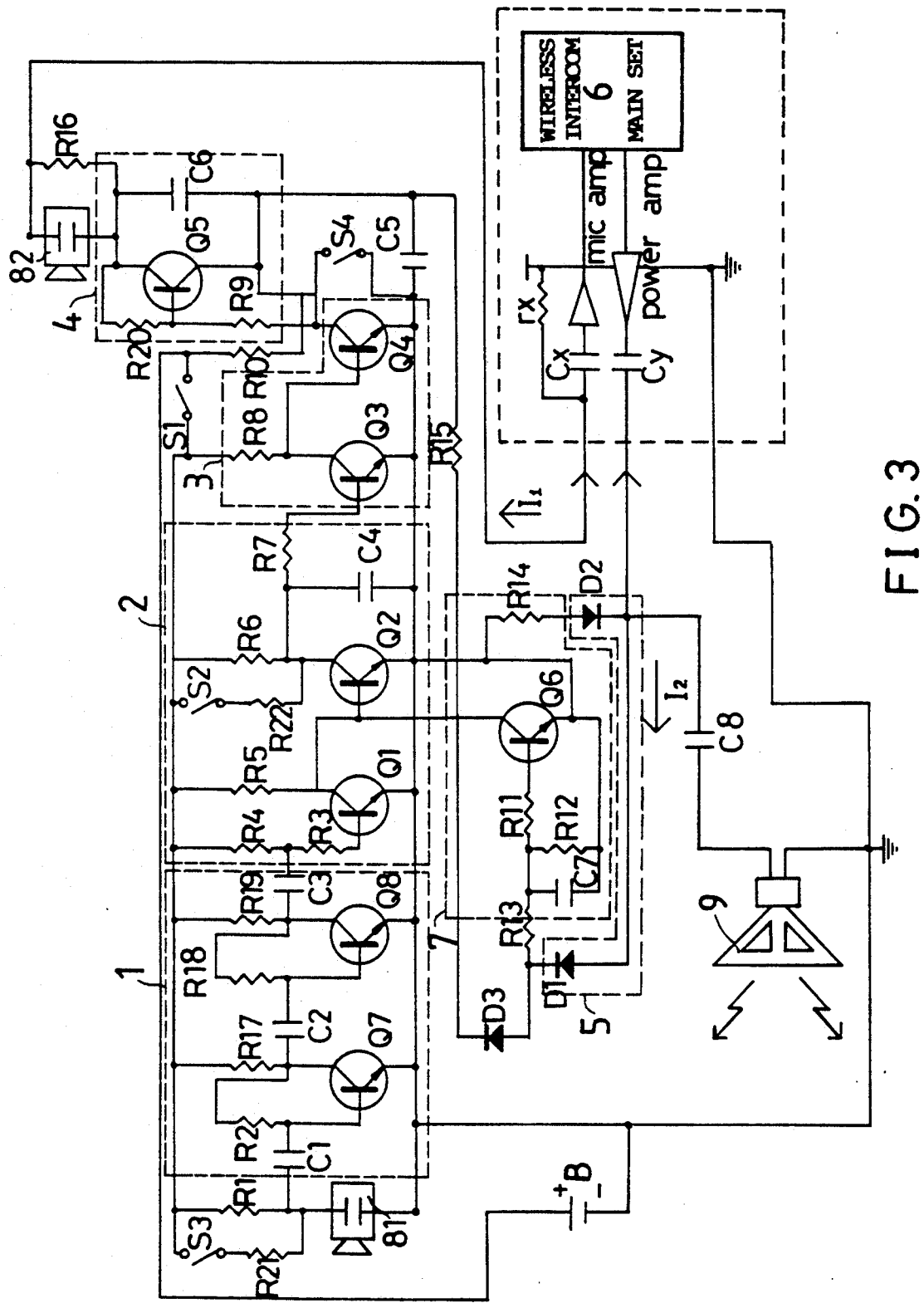
FIG. 3 is a schematic diagram showing an embodiment of the circuit of the present invention.

FIG. 2 is a functional block diagram of the whole assembly of the present invention, details of which are shown in FIG. 3. The voice-controllable, wireless intercom transceiver as depicted in FIG. 2 includes a first condenser microphone 81, an amplifying circuit 1, an integrating circuit 2, a switching characteristic booster or pulse shaping circuit 3, a transistor switching circuit 4, a second condenser microphone 82, a voltage multiplier rectifier circuit 5, a transceiver control circuit 7 and a speaker 9, wherein the first condenser microphone is connected with the amplifying circuit 1 in order to amplify the audio signal in preparation for integration. The amplified audio signal is output to an integrating circuit 2 for the purpose of integrating the audio signal output from the amplifying circuit to a hi-low signal or pulse. The output of the integrating circuit is in turn connected to pulse shaping circuit 3 which smooths the pulse to generate a square wave. Circuit 3 is in turn connected via a resistor K10 and a condenser C5 to the transistor switching circuit 4 which outputs the square wave to the second condenser microphone 82 and a manual switch PTT. The integrated audio signal 2 is also output from integrating circuit 2 to the voltage multiplier rectifier circuit 5 and subsequently to the transceiver control circuit 7 and the speaker 9. In addition, the second condenser microphone 82 and the voltage multiplier rectifier circuit 5 are further connected to wireless intercom main set 6 which is identical to the know main set 100 shown in FIG. 1 except that an external power source is not required and the battery does not require frequent replacement.

Referring to FIG. 3, the amplifying circuit 1 includes transistors Q7, Q8 in combination with capacitors C1, C2, C3 and resistors R1, R2, R17, R18, R19. The integrating circuit 2 includes transistors Q1, Q2, and resistors R3, R4, R5, R6, R7 in combination with condenser C4 as well as a switch S2. The switching characteristic booster or pulse smoothing circuit 3 includes transistors Q3, Q4 and resistors R8, R9. The switching circuit 4 includes a transistor Q5, a resistor R20 and a capacitor C6. The voltage multiplier rectifier circuit 5 includes a pair of diodes D1 and D2. Finally, the transceiver control circuit 7 includes a transistor Q6, resistors R11, R12 and a condenser C7. Additionally, a diode D3 is provided to prevent flow back through the transistor Q6.

Figure 4D:
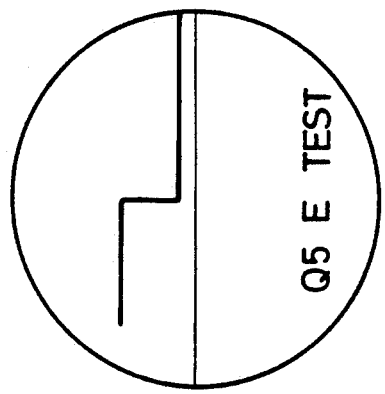
FIG. 4A to 4D are schematic diagrams showing the waveform of the segmented voltage of the invention on working time.
Figure 4C:
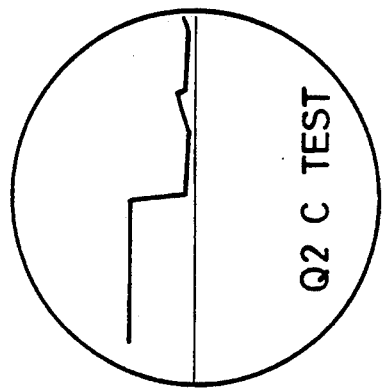
Figure 4B:
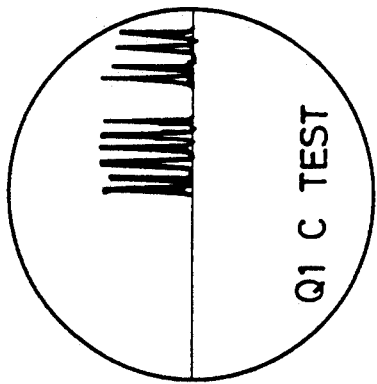
Figure 4A:
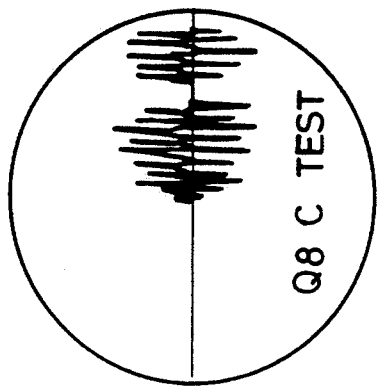

In operation, with reference to FIG. 3, while the wireless intercom transceiver of the invention is transmitting, the audio signal received by the condenser microphone 81 is amplified by the transistors Q7, Q8 of the amplifying circuit 1 to give a gain of one hundred times the audio signal. The amplified audio signal waveform is shown in FIG. 4A. The amplified audio signal is then sent to the transistor Q1 of the integrating circuit 2. Normally, transistor Q1 is kept in saturation. While receiving, the transistor Q1 senses the signal (the waveform thereof is as shown in FIG. 4B) at the collector thereof and transmits it to the transistor Q2, the resulting integrated signal or pulse having a waveform as shown in FIG. 4C. The pulse's waveform is then smoothed into a square wave shown in FIG. 4D by means of the pulse shaping circuit 3 in order to drive the transistor Q5 in the switching circuit 4.

The second condenser microphone 82 is connected in parallel with the resistor R16 and then to the microphone in put node of the wireless intercom main set 6. A bias voltage from the main set results in current I1 which flows through the second condenser 82, the resistor R16 in parallel, and the transistor Q5 driven by the square wave form circuit 3, is filtered while passing through the capacitor C5 and resistor R10 to charge battery B. The charging current I1 will be between 0.6 mA to 1.0 mA for a typical main set 6.

When the preferred wireless intercom transceiver is receiving, the speaker 9 is driven by a coupled capacitor output from the OTL amplifier which is conventionally provided inside of the wireless intercom main set 6, and by capacitor C8 connected in series with speaker 9 in the circuit of the invention. At the junction between capacitor Cy of the capacitor output and the capacitor C8 in the circuit of the present invention, the divided voltage is taken as a DC level. The DC level is maintained through multiplying the audio signal by the diodes D1, D2 in the voltage multiplier rectifier circuit 5, and integrated by the resistor R13 and capacitor C7. The resulting signal controls the base of transistor Q6 of the transceiver control circuit 7, which in turn controls the base of transistor Q2 in the integrating circuit 2 in such a manner that the audio control signal can be turned off during reception to make the transceiving smooth. The DC level passing through the diode D3 is further filtered by the resistor R15 and the capacitor C5 charge the battery via the resistor R10. The charging current I2 has a value, for example, of 1 mA to 30 mA. The resistors R14, R15 have a limitation effect so that the voltage multiplier rectifier circuit 5 will not affect the receiving quality.

Because the currents I1 and I2 are used by the voice-controllable transceiver of the invention, where working current is 0.3 mA, then the preferred transceiver has a self-feed function. As a result, no external power source is required, and frequent replacement of the battery is not required.

In the view of the above illustration, it can be seen that the wireless intercom, voice-controllable transceiver of the present invention has a self-feed function and thus does not require an external power source or frequent battery replacement.

The present invention has been described with reference to the preferred embodiments. As will be evident to those skilled in the art, however, various modifications of this invention can be made or followed in the light of the foregoing disclosure without departing from the spirit and scope of the claims.

I claim:

1. In a wireless intercom system including a wireless intercom main set and a voice control circuit, the improvement wherein said voice control circuit comprises:

a first condenser microphone;

an amplifying circuit connected to the first condenser microphone;

an integrating circuit connected to an output node of the amplifying circuit;

a switching characteristic booster circuit connected to an output node of the integrating circuit;

a transistor switching circuit connected to an output node of the switching characteristic booster circuit;

a second condenser microphone connected to an output node of the transistor switching circuit; and a voltage multiplier rectifier circuit connected to said output node of the integrating circuit and having an input node connected to a voltage output of said main set;

a battery connected to supply power for the voice control circuit;

a speaker connected via said input node of the rectifier circuit to said driving voltage output of said main set;

means for supplying a condenser microphone bias voltage from the main set to the second microphone and to the battery to give a charging current to the battery during transmission, and means for supplying a driving voltage from the main set to the speaker and to the battery during reception to give a charging current to the battery, thereby eliminating the need for frequent replacement of the battery.

* * * * *